US011194042B2

(12) United States Patent
Levander

(10) Patent No.: US 11,194,042 B2
(45) Date of Patent: Dec. 7, 2021

(54) TUG APPROACH CONTROL

(71) Applicant: KONGSBERG MARITIME CM AS, Alesund (NO)

(72) Inventor: Oskar Levander, Rauma (FI)

(73) Assignee: KONGSBERG MARITIME AS, Horten (NO)

( * ) Notice: Subject to any disclaimer, the term of this patent is extended or adjusted under 35 U.S.C. 154(b) by 457 days.

(21) Appl. No.: 16/313,077

(22) PCT Filed: Jun. 28, 2017

(86) PCT No.: PCT/NO2017/050168
§ 371 (c)(1),
(2) Date: Dec. 24, 2018

(87) PCT Pub. No.: WO2018/004352
PCT Pub. Date: Jan. 4, 2018

(65) Prior Publication Data
US 2019/0317209 A1  Oct. 17, 2019

(30) Foreign Application Priority Data

Jun. 30, 2016  (NO) .................................. 20161095

(51) Int. Cl.
*G01S 13/937* (2020.01)
*B63B 35/66* (2006.01)
*G01S 15/93* (2020.01)
*G01S 17/93* (2020.01)

(52) U.S. Cl.
CPC ............ *G01S 13/937* (2020.01); *B63B 35/66* (2013.01); *G01S 15/93* (2013.01); *G01S 17/93* (2013.01)

(58) Field of Classification Search
CPC ....... G01S 13/937; G01S 17/93; B63B 35/66; B63B 43/00
USPC .................... 340/851, 903, 984, 985; 342/41
See application file for complete search history.

(56) References Cited

U.S. PATENT DOCUMENTS

| 4,175,511 A * | 11/1979 | Krautkremer ............ B63H 5/14 440/54 |
| 4,352,596 A | 10/1982 | Hammett |
| 8,442,710 B2 | 5/2013 | Glaeser |
| 2012/0059577 A1 | 3/2012 | Dunkle |

(Continued)

FOREIGN PATENT DOCUMENTS

| EP | 2246765 | 11/2010 |
| GB | 2417017 | 2/2006 |
| KR | 20110059206 | 6/2011 |

(Continued)

OTHER PUBLICATIONS

Supplementary European Search Report mailed in EP 17820607 dated Dec. 2, 2019.

(Continued)

*Primary Examiner* — Eric Blount
(74) *Attorney, Agent, or Firm* — Wissing Miller LLP

(57) ABSTRACT

The invention relates to a tug for maneuvering a vessel, comprising at least one proximity sensor in a contact area, the proximity sensor being configured to detect a distance between the contact area and the vessel, and a tug controller unit controlling an approach of the tug towards the vessel based on the detected distance between the contact area and the vessel.

28 Claims, 3 Drawing Sheets

(56) References Cited

U.S. PATENT DOCUMENTS

2012/0072059 A1* 3/2012 Glaeser ................ B63B 49/00
 701/21
2015/0116143 A1* 4/2015 Nishiyama ............ G01S 13/538
 342/25 A

FOREIGN PATENT DOCUMENTS

| KR | 20160034642 | 3/2016 |
|----|-------------|--------|
| WO | 2016023080  | 8/2015 |

OTHER PUBLICATIONS https://www.strainstall.com/files/4714/4439/0427/IFS_Single_Leaflet_29.7.15_V 1.pdf (James Fisher and Sons plc) Jul. 29, 2015.
International Search Report mailed PCT/NO2017/050168 dated Sep. 22, 2017.
Written Opinion of the ISA mailed in PCT/NO2017/050168 dated Sep. 22, 2017.
NO Search Report mailed in 20161095 dated Jun. 30, 2016.

* cited by examiner

TUG APPROACH CONTROL

CROSS-REFERENCE TO RELATED APPLICATIONS

This application is a 371 of PCT/NO2017/050168 filed on Jun. 28, 2017, published on Jan. 4, 2018 under publication number WO 2018/004352A1, which claims priority benefits from Norwegian Patent Application No. 20161095 filed Jun. 30, 2016, both of which are incorporated herein in their entirety by reference.

INTRODUCTION

The present invention relates to a tug comprising a tug controller unit controlling an approach of the tug towards a vessel to be towed.

BACKGROUND

A tug, or tugboat, is a powerful boat or ship that is used for towing and pushing marine vessels. By towing and pushing the vessel, one or more tugs may maneuver the vessel during difficult maneuvering operations, such as in a harbor, in a narrow canal or during rescue operations of vessels in distress. During pushing operations the tug maneuvers the vessel by transmitting force to one of the sides of the hull of the vessel. For this operation to be performed the tug must approach the vessel and come into contact with the hull. If this is done incorrectly then it can severely damage the tug or the vessel.

For this operation to be performed without damaging the tug or the vessel, tug captains must gradually approach the vessel and softly come into contact with the hull of the vessel. This may be challenging even for an experienced captain, in particular in difficult weather. A spotter standing on the bow of the tug may observe the distance between the tug and the vessel and report to the captain, however this would expose the spotter to risk of personal injury.

SUMMARY OF THE INVENTION

According to a first aspect, the invention provides a tug for maneuvering a vessel, comprising at least one proximity sensor in a contact area, the proximity sensor being configured to detect a distance between the contact area and the vessel, and a tug controller unit controlling an approach of the tug towards the vessel based on the detected distance between the contact area and the vessel. The tug may be configured to detect a speed of approach of the tug towards the vessel, and the tug controller unit is further controlling the approach of the tug towards the vessel based on the detected speed of approach of the tug towards the vessel. The tug may further comprises at least one force sensor in the contact area, the force sensor being configured to measure an impact between the contact area and the vessel, and the tug controller unit is further controlling the approach of the tug towards the vessel based on the measured impact between the contact area and the vessel. The at least one force sensor may comprise an array of a plurality of force sensors. The at least one force sensor may be integrated in a tug fender. The tug controller unit may be configured to receive information of a speed and heading of the vessel from the vessel, and the tug controller unit is further controlling the approach of the tug towards the vessel based on the received information of the speed and heading of the vessel. The controlling the approach may be carried out autonomously by the tug controller unit. The tug controller unit may further comprises a dynamic positioning control system controlling the approach of the tug based on a plurality of input parameters, and the plurality of input parameters may comprise at least one of distance between the contact area and the vessel, speed of approach of the tug towards the vessel, impact between the contact area and the vessel, surface traffic, meteorological data, environmental data, movement of the vessel, location of the vessel, and electronic navigational charts. The proximity sensor may be one of a sonar, radar, lidar, Doppler radar, inductive proximity sensor and ultrasonic sensor.

According to a second aspect the invention provides a tug for maneuvering a vessel, comprising at least one force sensor in a contact area between the tug and the vessel, the force sensor being configured to measure the amount of force being transmitted to the vessel, and a the tug control unit controlling an amount of thrust provided by the tug on the vessel based on the measured amount of force being transmitted to the vessel. The at least one force sensor may be integrated in a tug fender. The at least one force sensor may comprise an array of a plurality of force sensors. The controlling the amount of thrust may be carried out autonomously by the tug controller unit. The tug controller unit may further comprise a dynamic positioning control system controlling the amount of thrust provided by the tug on the vessel based on a plurality of input parameters, and the plurality of input parameters may comprise at least one of force being transmitted to the vessel, surface traffic, meteorological data, environmental data, movement of the vessel, location of the vessel, and electronic navigational charts.

According to a third aspect, the invention provides a tug controller unit, wherein the tug controller unit is configured to receive data from at least one proximity sensor in a contact area of a tug, the received data comprises information regarding the distance between the contact area and a vessel, and the tug controller unit controls movements of the tug towards the vessel based on the received data. The received data may further comprise a speed of approach of the tug towards the vessel. Further, the tug controller unit may be configured to receive data from at least one force sensor in the contact area, the received data comprising information regarding an impact between the contact area and the vessel. The at least one force sensor may comprise an array of a plurality of force sensors. The tug controller may further be configured to receive information of a speed and heading of the vessel from the vessel, and the tug controller unit is further controlling the approach of the tug towards the vessel based on the received information of the speed and heading of the vessel. The tug controller unit may control the approach autonomously. The tug controller unit may further comprise a dynamic positioning control system controlling the approach of the tug based on a plurality of input parameters, and the plurality of input parameters may comprise at least one of distance between the contact area and the vessel, speed of approach of the tug towards the vessel, impact between the contact area and the vessel, surface traffic, meteorological data, environmental data, movement of the vessel, location of the vessel, and electronic navigational charts. The proximity sensor may be one of a sonar, radar, lidar, Doppler radar, inductive proximity sensor and ultrasonic sensor.

According to a firth aspect, the invention provides a tug controller unit, wherein the tug controller unit is configured to receive data from at least one force sensor in a contact area between a tug and a vessel, the received data comprising information regarding the amount of force being transmitted to the marine vessel, and the tug control unit controls an amount of thrust provided by the tug on the vessel based on the amount of force being transmitted to the vessel. The at least one force sensor may comprise an array of a plurality of force sensors. The controlling the amount of thrust may be carried out autonomously by the tug controller unit. The tug controller unit may further comprises a dynamic positioning control system controlling the amount of thrust provided by the tug on the vessel based on a plurality of input parameters, and the the plurality of input parameters may comprise at least one of force being transmitted to the vessel, surface traffic, meteorological data, environmental data, movement of the vessel, location of the vessel, and electronic navigational charts.

BRIEF DESCRIPTION OF DRAWINGS

Embodiments of the invention will now be described with reference to the followings drawings, where.

DETAILED DESCRIPTION

Figure 1:
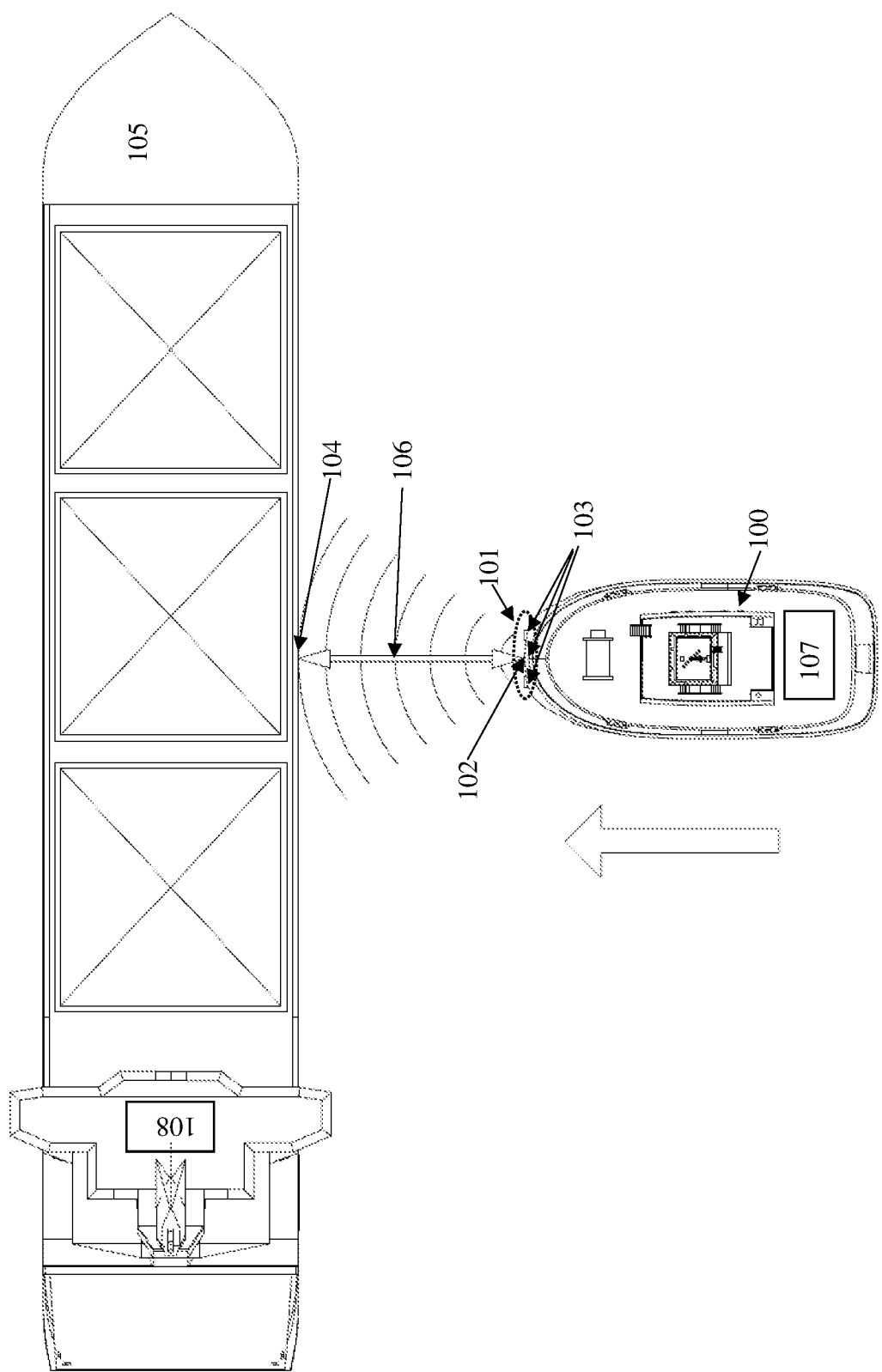
FIG. 1 shows a top perspective view of a tug approaching a marine vessel.

The present invention will be described with reference to the drawings. The same reference numerals are used for the same or similar features in all the drawings and throughout the description.

Tug

FIG. 1 shows a perspective view of a tug 100 approaching a marine vessel 105, hereinafter referred to as the vessel 105. The tug 100 is about to initiate a pushing operation on the vessel 105 to manoeuvre the vessel by pushing on a side 104 of the hull of the vessel. For this operation to be performed the tug 100 approaches the vessel 105 and a contact area 101 of the tug eventually comes into contact with the side 104 of the vessel. The contact area 101 is provided with resilient tug fenders that absorb energy during contact and protects both colliding surfaces. The tug 100 comprises at least one proximity sensor 102 in the contact area 101. The proximity sensor 102 is configured to detect a distance 106 between the contact area 101 and the vessel 105. The tug 100 is further provided with a tug controller unit 107 controlling the approach of the tug towards the vessel 105 based on the detected distance 106 between the contact area 101 and the marine vessel 105. In this manner may the approach be adjusted to allow a soft touch onto the side 104 of the hull. In example, the tug may move at a higher speed when at a larger distance than when the distance is shorter. The proximity sensor 102 may further be configured to detect a speed of approach of the tug 100 towards the vessel 105. The tug controller unit 107 may then further control the approach of the tug 100 towards the vessel 105 based on the detected speed of approach of the tug towards the vessel. In this manner may the speed of approach be combined with the remaining distance between the tug and the vessel to further adjust the approach of the tug 100. The proximity sensor 102 may be any suitable proximity sensor, such as one of a sonar, radar, lidar, Doppler radar, inductive proximity sensor and ultrasonic sensor.

The tug 100 may also comprise at least one force sensor 103 in the contact area 101. The force sensor 103 may be integrated in a tug fender. Alternatively, the force sensor 103 may be positioned external to the tug fenders, e.g. between the tug fender and the hull of the tug 100, or between tug fender elements. The force sensor 103 is configured to measure an impact between the contact area 101 and the marine vessel 105. The tug controller unit 107 may then further control the approach of the tug 100 towards the vessel 105 based on the measured impact between the contact area 101 and the marine vessel 105. In this manner, the approach may be adjusted as the resilient tug fenders are being compressed. The at least one force sensor 103 may comprise an array of a plurality of force sensors. The plurality of force sensors may be spatially distributed along the contact point 101, e.g. substantially parallel with the water surface. When the contact surface 101 of the tug is not perpendicular on the side 104 of the vessel 105, the plurality of sensors will measure different impact values. Thus, the tug controller unit 107 may determine to adjust the direction of the tug 100 to optimize the direction of the pushing force on the side 104 of vessel 105.

The tug 100 and the vessel 105 may be provided with antennas, communication units, radars, sensors etc. The vessel 105 may be provided with a vessel controller unit 108 controlling the speed and heading of the vessel. The tug controller unit 107 may be adapted to receive information of a speed and heading of the vessel from the vessel 105, in example from the vessel controller unit 108. The tug 100 may be further controlling the approach of the tug towards the vessel 105 based on the received information of the speed and heading of the vessel.

Figure 2:
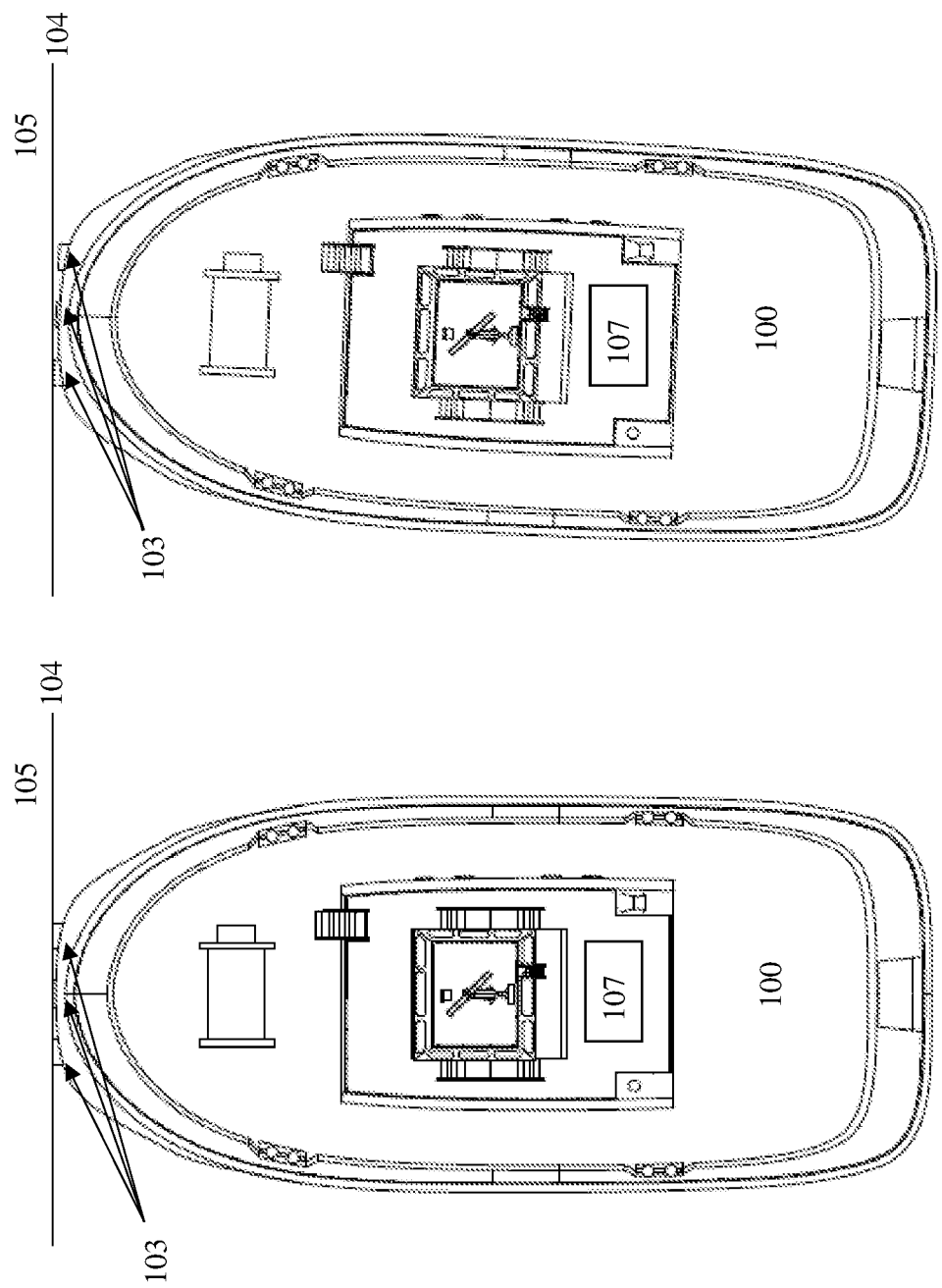
FIGS. 2a-2b shows a top perspective view of a tug approaching a marine vessel.

FIGS. 2a-2b shows an exemplary embodiment of the invention seen in perspective view, where the tug 100 is maneuvering the vessel 105. The force sensor 103 is configured to measure the amount of force being transmitted to the marine vessel 105, and the tug controller unit 107 may control an amount of thrust provided by the tug 100 on the vessel 105 based on the measured amount of force being transmitted to the marine vessel 105. The force sensor 103 may be integrated in a tug fender. Alternatively, the force sensor 103 may be positioned external to the tug fenders e.g. between the tug fender and the hull of the tug 100, or between tug fender elements. The force sensor 103 may transmit information to the tug controller unit 107 regarding how much trust is being provided on the vessel 105. The tug controller unit 107 may then use that information to optimize the maneuver of the vessel 105. The at least one force sensor 103 may comprise an array of a plurality of force sensors. The plurality of force sensors 103 may be spatially distributed along the contact point 101, e.g. substantially parallel with the water surface. When the contact surface 101 of the tug is not perpendicular on the side of the vessel 105 as illustrated in FIG. 2b, the plurality of sensors will measure different thrust values. Thus, the tug controller unit 107 may determine to adjust the direction of the thrust to optimize the direction of the pushing force on the side 104 of vessel 105. In the case illustrated in FIG. 2b, the tug controller, for example, may determine adjust the direction of thrust to move the stern of the tug 100 in starboard direction.

Tug Controller Unit

Figure 3:
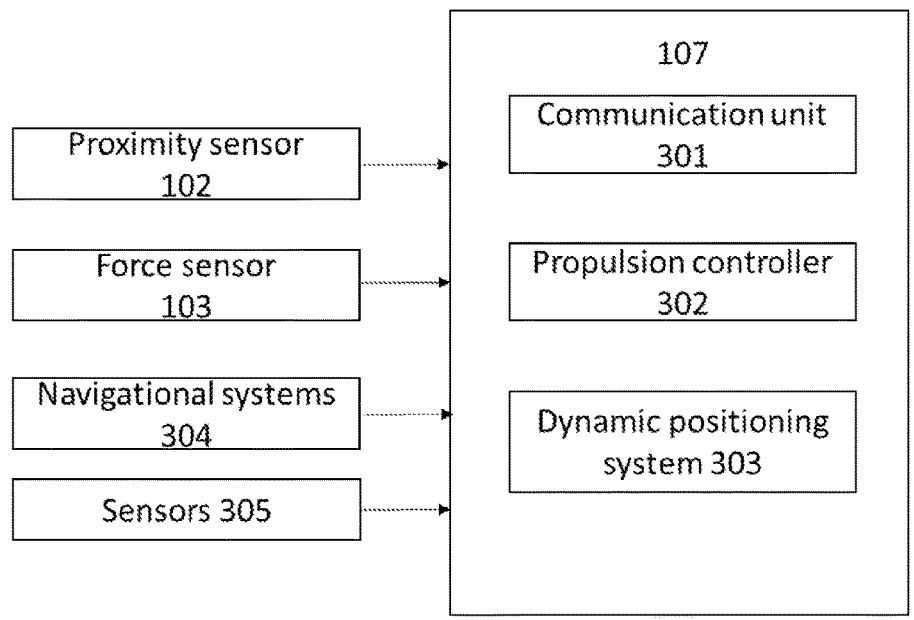
FIG. 3 illustrates an exemplary tug controller unit.

The tug is provided with a tug controller unit 107 as illustrated in FIG. 3. The tug controller 107 controls movements of the tug 100 by a propulsion controller 302. When approaching a marine vessel 105 about to be maneuvered, the tug controller unit 107 receives data from the least one proximity sensor 102. The received data comprises information regarding the distance 106 between the contact area 101 and the marine vessel 105, that is, the remaining distance to contact between the contact area of tug and the side of vessel. The received data from the proximity sensor 102 may also comprise the speed of approach towards the vessel 105. After receiving the data, the tug controller unit 107 instructs the propulsion controller 302 to move towards the vessel 105 based on the received data. In example, if the remaining distance is short and/or the approach speed is high, the propulsion controller 302 would be instructed to slow down the tug 100.

The tug controller unit 107 may also receive information from the at least one force sensor 103 regarding the impact between the contact area 101 and the marine vessel 105. The tug controller unit 107 may then further instruct the propulsion controller 302 to move the tug 100 towards the vessel 105 based on the received data. In the case the at least one force sensor 103 comprises an array of a plurality of force sensors, the tug controller unit 107 receives impact data from a plurality of force sensors 103. If the plurality of sensors measures 103 different impact values, then the tug controller unit 107 may instruct the propulsion controller 302 to change not only the speed of the tug 100, but also the direction of the tug to optimize the direction of the pushing force on the side 104 of vessel 105.

The tug controller unit 107 may receive information, by a communication module 301, from the marine vessel 105 about to the maneuvered by the tug 100, of a speed and heading of the vessel 105. The tug controller unit 107 may then further instruct the propulsion controller unit 302 to the approach the vessel 105 based on the received information of the speed and heading of the vessel 105.

The tug controller unit 107 may work in unison with steering input from the captain of the tug 100, such that the captain can cede the controlling of the approach to the tug controller unit 107, while the captain focuses on the maneuvering, surface traffic etc. In this manner is the controlling the approach carried out semi-autonomously by the tug controller unit 107. Alternatively, the captain may provide predetermined instructions to the tug controller unit 107 that autonomously carries out the controlling of the approach.

When the tug 100 is maneuvring the vessel 105, the tug controller unit 107 may receive information from the at least one force sensor 103 regarding the amount of force being transmitted to the marine vessel 105. The tug controller unit may 107 then instruct the propulsion controller 302 change the amount of thrust being provided by the tug 100 on the vessel 105 based on the received information. In the case the at least one force sensor 103 comprises an array of a plurality of force sensors 103, the tug controller unit 107 receives force, or thrust, data from the plurality of force sensors 103. If the plurality of force sensors 103 measures different force values, then the tug controller unit 107 may instruct the propulsion controller 302 to change not only the amount of thrust being provided on the vessel 105, but also the direction of the thrust to optimize the maneuver of the vessel 105.

When the tug 100 is approaching the vessel 105 or when maneuvering the vessel 105, the tug 100 is acted on by wind, waves and sea current. In addition, the tug 100 often operates under difficult maneuvering operations, such as in a harbor or in a narrow canal, where the tug may face other hazards such as other surface traffic, land, rocks and other fixed hazards. The tug controller unit 107 may therefore comprise a dynamic positioning (DP) control system 303 that receives a plurality of input parameters from sensors 102, 103, 305 and navigational systems 304. Based on the plurality of input parameters the DP control system 303 is controlling the position, heading and amount of thrust of the tug 100. The DP control system 303 determines when, where and how the tug 100 should be moved. When the DP control system 303 determines that the tug 100 should move, the DP control system 303 outputs movement instructions including speed and direction to the propulsion control unit 302. The dynamic positioning control system 303 may autonomously control the tug 100 based on a plurality of input parameters obtained from a plurality of sensors 102, 103, 305 and navigational systems 304.

Figure 4:
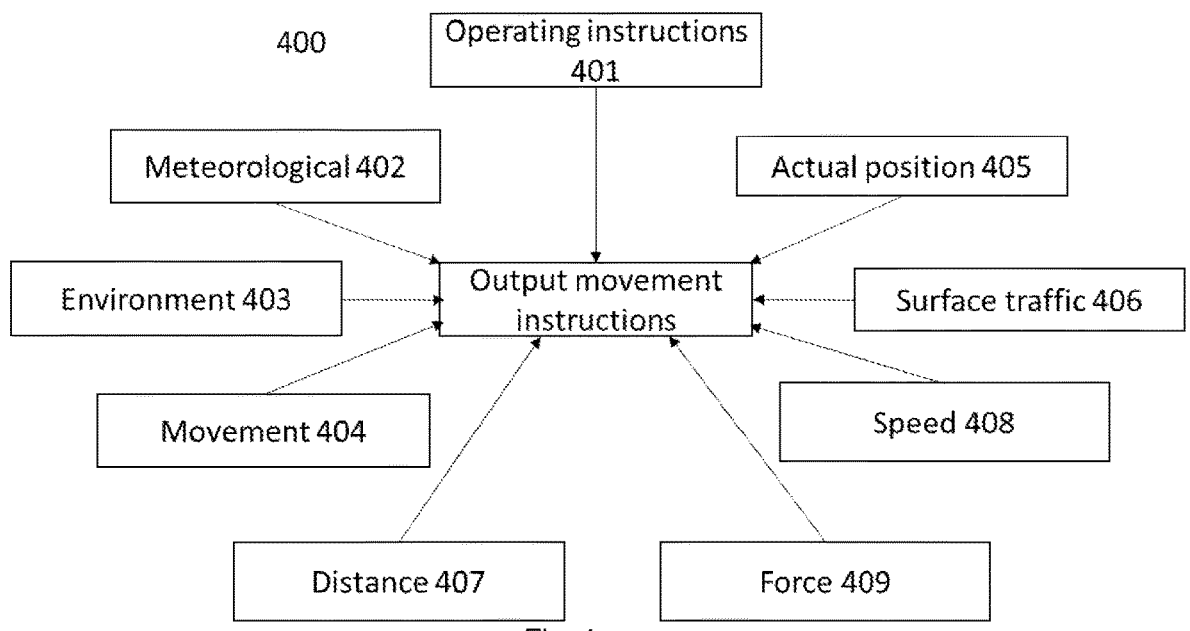
FIG. 4 illustrates an exemplary dynamic positioning control system.

FIG. 4 illustrates an exemplary arrangement 400 for the dynamic positioning control system 303. The DP control system 303 checks current operating instructions 401. The DP control system 303 may check parameters relating meteorological input parameters 402, environmental input parameters 403, movement of the tug 404, distance between the contact area and the marine vessel 407, speed of approach of the tug towards the vessel 408 and impact between the contact area and the marine vessel 409. If the tug 100 has drifted away, or is likely to drift away, from the vessel 105, or the position of the tug 100 relative to the vessel 105 has changed, the DP control system 303 outputs movement instructions to counteract the drift or change in position. The DP control system 303 may also check parameters relating to the actual position of the tug 100 relative to land, rocks and other fixed hazards 405. If the DP control system 303 determines that the tug 100 or vessel 105 is too close to any fixed hazards, the DP control system 303 outputs movement instructions to move the tug 100 and vessel 105 safely away from the fixed hazards. The DP control system 303 may also check parameters relating to the position of the vessel 105 relative to other surface traffic 406, evaluates the surface traffic parameters in view of relevant navigational rules. If the DP control system 303 determines that the tug 100 or vessel 105 should move away from other surface traffic, the DP control system 303 outputs movement instructions to move the tug 100 and vessel 105 accordingly.

Wind, waves and sea currents acting on the tug 100 or vessel 105 causes the tug or vessel to move from the desired location or path. The DP control system 303 may calculate the movement from the desired location or path, e.g. the drift, based on meteorological parameters and environmental input parameters such as wind direction, wind strength, water temperature, air temperature, barometric pressure, wave height etc. The input parameters are provided by relevant sensors connected to DP control system such as a wind meter, thermometer, barometer etc. When the DP-control system 303 has calculated the drift, the system output movement instructions to counteract the drift. Other input parameters to calculate the drift may include data from movement sensors such as a gyro, an accelerometer, a gyrocompass and a turn-rate indicator.

Movement of the tug 100 or vessel 105 may also be calculated from actual position parameters of the tug 100 or vessel 105 relative to the desired location. The actual position parameters may be obtained from navigation systems 304 connected to the DP control system 303. The navigation system 304 may be a ground based radio navigation system, such as DECCA, LORAN, GEE and Omega, or a satellite navigation systems, such as GPS, GLONASS, Galileo and BeiDou. In the case of satellite navigation systems, the accuracy of the actual location may be improved by input to the CP control system 303 from a Differential Global Positioning System (DGPS).

The DP-control system 303 may also receive input parameters from electronic navigational charts. Combined with input parameters from the navigation systems, this allows the DP control system 303 to determine movement instructions that safely controls the tug 100 and vessel 105 from colliding with land, rocks and other fixed hazards. For this purpose, the DP-control system 303 may also receive input parameters from other sensors such as a sonar, marine radar, and/or an optical system using a camera. The sonar may provide information about underwater hazards such as land, rocks, underwater vessel etc. The marine radar and/or optical system may provide information about overwater hazards such as land and other surface vessels. The marine radar and/or optical system may also provide navigation information from sea marks such as beacons, buoys, racons, cairns and lighthouses.

The tug 100 will have to comply with navigational rules for preventing collision with other ships or vessels. A database comprising the relevant navigational rules for an operation location of the tug may be included in the DP control system 303. In one embodiment, the DP control system 303 receives input parameters relating to other surface traffic, evaluates the surface traffic parameters in view of the relevant navigational rules, when determining when and where the tug 100 should be moved. The input parameters relating to surface traffic may be provided by sensors and systems connected to the vessel controller unit such as a marine radar, an Automatic Identification System (AIS) and an automatic radar plotting aid (ARPA). In one embodiment, the input parameters relating to surface traffic may be provided by optical sensors such as a camera. The optical sensors may observe and recognize other surface vessels and provide navigation information from sea marks such as beacons, buoys, cairns and lighthouses.

The tug controller unit 107, the dynamic positioning control system 303 and the propulsion control unit 302 may be implemented in a computer having at least one processor and at least one memory. An operating system runs on the at least one processor. Custom programs, controlled by the system, are moved into and out of memory. These programs include at least the tug controller unit 107, the dynamic positioning control system 303 and the propulsion control unit 302 as described above. The system may further contain a removable memory component for transferring images, maps, instructions or programs.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. Tug for maneuvering a vessel, the tug comprising:
   at least one proximity sensor in a contact area, the proximity sensor being configured to detect a distance between the contact area and the vessel; and
   a tug controller unit controlling an approach of the tug towards the vessel based on the detected distance between the contact area and the vessel;
   wherein the tug further comprises at least one force sensor in the contact area, the force sensor being configured to measure an impact between the contact area and the vessel, and the tug controller unit is further controlling the approach of the tug towards the vessel based on the measured impact between the contact area and the vessel.

2. Tug according to claim 1, wherein the proximity sensor is further configured to detect a speed of approach of the tug towards the vessel, and the tug controller unit is further controlling the approach of the tug towards the vessel based on the detected speed of approach of the tug towards the vessel.

3. Tug according to claim 1, wherein the at least one force sensor is integrated in a tug fender.

4. Tug according to claim 1, wherein the at least one force sensor comprises an array of a plurality of force sensors.

5. Tug according to claim 1, wherein the tug controller unit is configured to receive information of a speed and heading of the vessel from the vessel, and the tug controller unit is further controlling the approach of the tug towards the vessel based on the received information of the speed and heading of the vessel.

6. Tug according to claim 1, wherein the controlling the approach is carried out autonomously by the tug controller unit.

7. Tug according to claim 1, wherein the proximity sensor is one of a sonar, radar, lidar, Doppler radar, inductive proximity sensor and ultrasonic sensor.

8. Tug for maneuvering a vessel, the tug comprising:
   at least one proximity sensor in a contact area, the proximity sensor being configured to detect a distance between the contact area and the vessel; and
   a tug controller unit controlling an approach of the tug towards the vessel based on the detected distance between the contact area and the vessel, wherein the tug controller unit further includes a dynamic positioning control system controlling the approach of the tug based on a plurality of input parameters.

9. Tug according to claim 8, wherein the plurality of input parameters comprise at least one of:
   distance between the contact area and the vessel;
   speed of approach of the tug towards the vessel;
   impact between the contact area and the vessel;
   surface traffic;
   meteorological data;
   environmental data;
   movement of the vessel;
   location of the vessel; and
   electronic navigational charts.

10. Tug for maneuvering a vessel, the tug comprising:
    at least one force sensor in a contact area between the tug and the vessel, the force sensor being configured to measure the amount of force being transmitted to the vessel; and
    a tug control unit controlling an amount of thrust provided by the tug on the vessel based on the measured amount of force being transmitted to the vessel.

11. Tug according to claim 10, wherein the at least one force sensor is integrated in a tug fender.

12. Tug according to claim 10, wherein the at least one force sensor comprises an array of a plurality of force sensors.

13. Tug according to claim 12, wherein the controlling the amount of thrust is carried out autonomously by the tug controller unit.

14. Tug according to claim 10, wherein the tug controller unit further comprises a dynamic positioning control system controlling the amount of thrust provided by the tug on the vessel based on a plurality of input parameters.

15. Tug according to claim 14, wherein the plurality of input parameters comprise at least one of:
    force being transmitted to the vessel;
    surface traffic;
    meteorological data;
    environmental data;
    movement of the vessel;

location of the vessel; and electronic navigational charts.

16. Tug controller unit, wherein
the tug controller unit is configured to receive data from at least one proximity sensor in a contact area of a tug, the received data comprises information regarding the distance between the contact area and a vessel;
the tug controller unit controls movements of the tug towards the vessel based on the received data; and
the tug controller unit is further configured to receive data from at least one force sensor in the contact area, the received data including information regarding an impact between the contact area and the vessel.

17. Tug controller unit according to claim 16, wherein the received data further comprises a speed of approach of the tug towards the vessel.

18. Tug controller unit according to claim 16, wherein the at least one force sensor comprises an array of a plurality of force sensors.

19. Tug controller unit according to claim 16, wherein the tug controller unit is configured to receive information of a speed and heading of the vessel from the vessel, and the tug controller unit is further controlling the approach of the tug towards the vessel based on the received information of the speed and heading of the vessel.

20. Tug controller unit according to claim 16, wherein tug controller unit controls the approach autonomously.

21. Tug controller unit according to claim 16, wherein the proximity sensor is one of a sonar, radar, lidar, Doppler radar, inductive proximity sensor and ultrasonic sensor.

22. Tug controller unit, wherein
the tug controller unit is configured to receive data from at least one proximity sensor in a contact area of a tug, the received data comprises information regarding the distance between the contact area and a vessel;
the tug controller unit controls movements of the tug towards the vessel based on the received data; and
the tug controller unit further includes a dynamic positioning control system controlling the approach of the tug based on a plurality of input parameters.

23. Tug controller unit according to claim 22, wherein the plurality of input parameters comprise at least one of:
distance between the contact area and the vessel;
speed of approach of the tug towards the vessel;
impact between the contact area and the vessel;
surface traffic;
meteorological data;
environmental data;
movement of the vessel;
location of the vessel; and
electronic navigational charts.

24. Tug controller unit, wherein
the tug controller unit is configured to receive data from at least one force sensor in a contact area between a tug and a vessel, the received data comprising information regarding the amount of force being transmitted to the marine vessel; and
the tug control unit controls an amount of thrust provided by the tug on the vessel based on the amount of force being transmitted to the vessel.

25. Tug controller unit according to claim 24, wherein the at least one force sensor comprises an array of a plurality of force sensors.

26. Tug controller unit according to claim 24, wherein the controlling the amount of thrust is carried out autonomously by the tug controller unit.

27. Tug controller unit according to claim 24, wherein the tug controller unit further comprises a dynamic positioning control system controlling the amount of thrust provided by the tug on the vessel based on a plurality of input parameters.

28. Tug according to claim 27, wherein the plurality of input parameters comprise at least one of:
force being transmitted to the vessel;
surface traffic;
meteorological data;
environmental data;
movement of the vessel;
location of the vessel; and
electronic navigational charts.

* * * * *